United States Patent [19]

Testa

[11] Patent Number: 4,610,107
[45] Date of Patent: Sep. 9, 1986

[54] VINE TRAINER KIT

[76] Inventor: William B. Testa, 3293 Temple Dr., Huntington Beach, Calif. 92649

[21] Appl. No.: 734,586

[22] Filed: May 15, 1985

Related U.S. Application Data

[63] Continuation of Ser. No. 586,193, Mar. 5, 1985.

[51] Int. Cl.$^4$ ............................................. A01G 17/06
[52] U.S. Cl. ........................................................ 47/47
[58] Field of Search ................. 47/47, 45, 46; 428/18; 411/389; 248/156

[56] References Cited

U.S. PATENT DOCUMENTS

| | | | |
|---|---|---|---|
| 1,974,367 | 9/1934 | Schaible | 47/47 |
| 2,556,362 | 6/1951 | Crumpler | 248/156 |
| 3,606,222 | 4/1969 | Howard | 248/156 |
| 4,117,628 | 10/1978 | Smith | 47/47 |

FOREIGN PATENT DOCUMENTS 9018  6/1915  United Kingdom ..................... 47/47

Primary Examiner—Robert A. Hafer
Assistant Examiner—Bradley M. Lewis
Attorney, Agent, or Firm—Fulwider, Patton, Rieber, Lee & Utecht

[57] ABSTRACT

An improved vine trainer is disclosed which is readily assembled and disassembled to become portable in kit form. A central stake is comprised of a plurality of interconnected sections. A number of rods, shorter in length than the central stake, are stacked and crossed with each rod bisecting the others and are removably affixed to the upper portion of the central stake. The rods are formed with openings on each end for receiving twine, wire, or the like, and secured to ground stakes which are inserted into the earth or potting soil of a potted plant, providing a substantially vertical and rigid surface on which plant vines can grow.

3 Claims, 6 Drawing Figures

U.S. Patent    Sep. 9, 1986    4,610,107
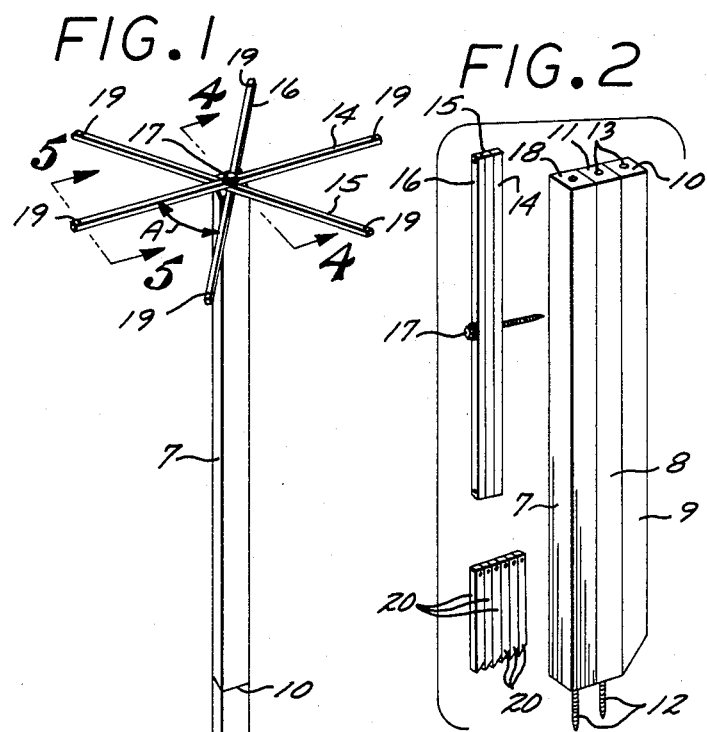
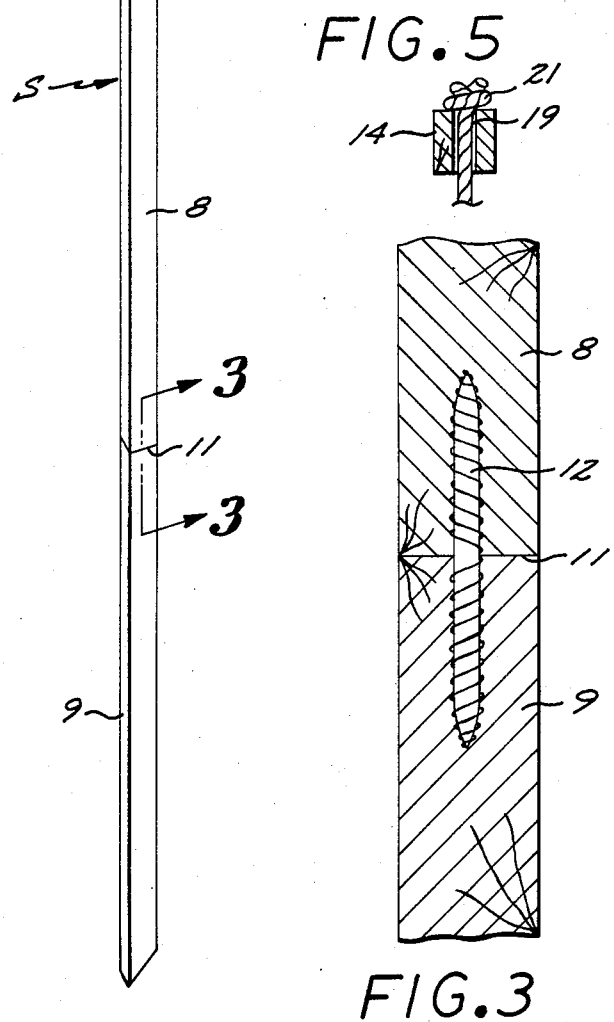
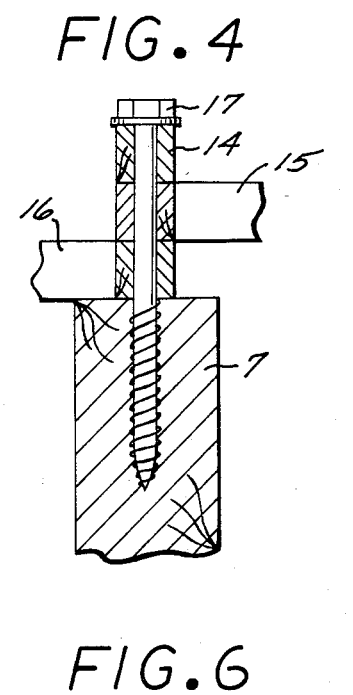
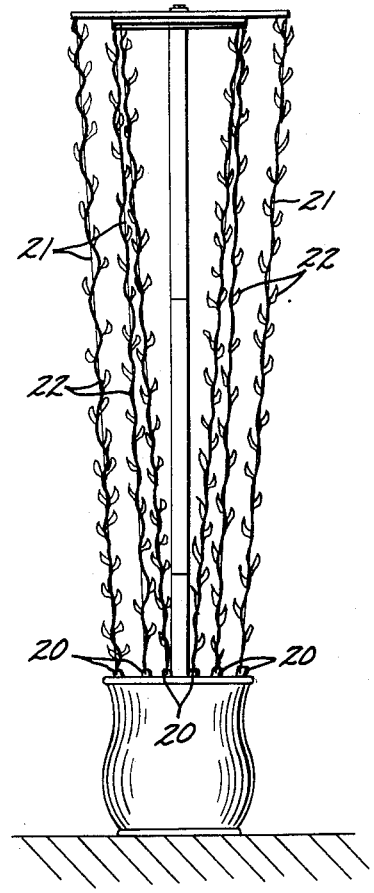

4,610,107

VINE TRAINER KIT

This is a continuation of application Ser. No. 06/586,193, filed Mar. 5, 1985.

BACKGROUND OF THE INVENTION

1. Field of the Invention

The vine trainer kit of the present invention relates generally to devices which provide a substantially vertical and rigid surface on which to train plant vines.

2. Description of the Prior Art

Horticulturists have long recognized the need to provide a means for plant vines to grow upwards towards the light. A vine trainer provides a means for the plants to grow upward towards the light and efficiently utilize available space, as in a greenhouse or any confined area. The recent popularity of potted plants and hydroponics has resulted in a need for a vine trainer suitable for plants which grow in a container. Previous devices utilize a disc like member which had to be attached to the central stake as in Watrous, U.S. Pat. No. 377,444, which uses a circular disc with attached hooks for suspending wire. The circular disc must be affixed to the central stake by nails or the like, and once affixed, is not readily removed. A circular loop formed in a single piece is also utilized to fix the wire to the ground. A single piece loop rod limits the applications of the invention because it cannot be used, for example for potted plants when the diameter of the container is less than the diameter of the loop rod.

In both Watrous and Schaible, U.S. Pat. No. 1,974,367, the size is limited by the height of the central pole which is formed in one piece. No prior device is capable of adjusting the height of the central stake in accordance with the length of the plant vine. Further, neither device may be disassembled into sufficiently small pieces for ease and transporting, as in a kit. Schaible is also ill-suited for use with potted plants. In order to produce an arrangement in which the wire or other flexible elements are pulled taut when affixed by stakes in the earth of a potted plant, the disc secured to the upper end of the central pole would be required to be of a diameter so large that it would block the sunlight and shade the plants.

SUMMARY OF THE INVENTION

It is therefore an object of the present invention to provide a vine trainer in which the height can be adjusted in accordance with the size of the plant. It is a major object of my invention to provide a vine trainer which may be readily assembled and disassembled in kit form. It is a further object of my invention to provide a vine trainer suitable for use with potted plants in containers of all sizes and which will not block the sunlight over the plants.

The central stake comprises a plurality of interconnected sections. The height of the central stake is adjusted by adding or substracting sections depending on the length of the plant vine. Flexible wire, twine or the like is suspended from a series of rods formed with openings to receive flexible wire or twine. The rods are stacked upon each other such that each bisects the other and are fastened to the upward defacing flat surface of the upper portion of the central stake at the mid-point of each rod. The twine is pulled taut from the rod and affixed to the ground with individual stakes formings a substantially vertical and rigid surface.

Other objects and features of the invention will become apparent from consideration of the following description taken in connection with the accompanying drawings.

BRIEF DESCRIPTION OF THE DRAWINGS

FIG. 1 is a perspective view of preferred form of the improved vine trainer kit of the present invention;

FIG. 2 is a view of the disassembled parts of the present invention;

FIG. 3 is an enlarged vertical sectional view taken along the line 3—3 of FIG. 1;

FIG. 4 is a horizontal sectional view taken along the line 4—4 of FIG. 1;

FIG. 5 is a horizontal sectional view taken along the line 5—5 of FIG. 1; and

FIG. 6 is a side elevational view of a preferred embodiment of the present invention.

DESCRIPTION OF A PREFERRED EMBODIMENT

Referring to FIGS. 1 and 6, there is shown a preferred form of an assembled improved vine trainer kit embodying the present invention. The improved vine trainer kit includes a central stake, generally designated S, which is comprised of a plurality of longitudinally-aligned interconnected sections 7, 8 and 9 in sufficient number to achieve the desired height. The flat upwardly facing surface of the upper portion of section 9 is fastened at 11 to the flat downwardly facing surface of the lower end of section 8. Referring to FIG. 3, it will be appreciated that the sections of the central stake are connected by lag bolts 12 which are placed into openings 13 provided in the flat, upwardly facing surfaces 18 and 10 of sections 7 and 8, respectively, and the upwardly facing surface of section 9, as best seen in FIG. 2. The lower portion of section 9 is tapered forming a pointed lower extremity for insertion into the soil. The central stake S is placed into the earth at a depth sufficient to maintain the stake upright as seen in FIG. 6.

With reference to FIG. 1 and FIG. 4, rod 14 is placed on rod 15 and both are placed on rod 16 such that each rod bisects each of the other rod members. The rods are affixed at their mid-points to the upwardly facing upper extremity 18 of the uppermost section 7 of central stake S in a horizontal plane with bolt 17, as best seen in FIG. 4. The rods are relatively angularly separated with each rod forming an angle A with the rod immediately adjacent to it as shown in FIG. 1. In a preferred embodiment, the rods are spaced such that distance from all of the angles formed by the rods are equal.

With reference to FIG. 1 and FIG. 5, rods 14, 15 and 16 are formed with openings 19 on each end to receive flexible elements, which typically include twine, wire or the like. The flexible elements are threaded through openings 19 and knotted on the first end such that the knot cannot pass through the opening 19, as best seen in FIG. 5. The flexible element is pulled taut and fastened on its second end to ground stakes 20 for placement in the soil as best seen in FIG. 6. The flexible elements form a substantially vertical and rigid surface on which the plant vines 22 grow.

The vine trainer is easily disassembled and made portable by first removing bolt 17, thus removing the rods 14, 15, and 16 from the central stake S. The central stake is easily disassembled by turning section 7 and removing it from section 8, and section 8 is then removed from section 9, and ground stakes 20 are removed and the vine trainer is a compact collection of parts, which are readily transportable in a relatively small space. Although the vine trainer of the present invention is typically comprised of wood, it will be appreciated that other materials may be used.

Various modifications and changes may be made with respect to the foregoing description without departing from the spirit of the present invention.

I claim:

1. A vine training kit which is assembled for positioning in a container to train vines to grow upwardly along a plurality of strings, said kit comprising:
   a central stake member having a plurality of removably interconnected, longitudinally-alignable sections, the lowermost section being formed with a pointed lower extremity, and the uppermost section being formed with an upwardly-facing upper extremity; and
   a plurality of rod members having a length greater than the width of said container, said rod members intersecting each other at their mid-points and removably affixed at their mid-points to said upwardly-facing upper extremity of the uppermost section of said central stake member in a horizontal plane, each of said rod members being relatively angularly displaceable and positionable each with respect to the other with the upper ends of said strings being attached to the extremities of said rod members for angularly displacing said strings each with respect to the other throughout their extended lengths, and with the lower ends of said strings being affixed to the ground.

2. A vine training kit which is assembled for positioning in the ground to train vines to grow upwardly along a plurality of strings, said kit comprising:
   a central stake member having a plurality of removably interconnected, longitudinally-alignable sections, the lowermost section being formed with a pointed lower extremity, and the uppermost section being formed with an upwardly-facing upper extremity; and
   a plurality of rod members intersecting each other at their mid-points and removably affixed at their mid-points to said upwardly facing upper extremity of the uppermost section of said central stake member in a horizontal plane, each of said rod members being relatively angularly displaced in predetermined angular orientation each with respect to the other with the upper ends of said strings attached to the extremities of said rod members, and the lower ends of said strings affixed to the ground for angularly displacing said strings each with respect to the other throughout their extended lengths.

3. The vine training kit of claim 1 further including a bolt for inserting through said rods and received by said upwardly-facing upper extremity of said central stake member thereby removably affixing said rods to said central stake member and permitting relative angular displacement of each of said rods with respect to each other.

* * * * *